United States Patent [19]

Ames

[11] 4,075,862
[45] Feb. 28, 1978

[54] METHOD AND APPARATUS FOR INSTALLING UNDERWATER FLOWLINES

[75] Inventor: Thomas J. Ames, Houston, Tex.

[73] Assignee: FMC Corporation, San Jose, Calif.

[21] Appl. No.: 723,379

[22] Filed: Sep. 15, 1976

[51] Int. Cl.² .............................................. F16L 1/00
[52] U.S. Cl. ......................................... 61/110; 166/.6
[58] Field of Search ................. 61/110, 111, 112, 107; 166/.5, .6

[56] References Cited

U.S. PATENT DOCUMENTS

| | | | |
|---|---|---|---|
| 3,352,356 | 11/1967 | Wakefield, Jr. | 61/110 |
| 3,524,325 | 8/1970 | Brown | 61/110 |
| 3,592,014 | 7/1971 | Brown et al. | 61/110 |

*Primary Examiner*—Jacob Shapiro
*Attorney, Agent, or Firm*—W. W. Ritt, Jr.; C. E. Tripp

[57] ABSTRACT

A method and apparatus for installing a length of underwater pipe, such as a petroleum flowline bundle, between two subsea stations, for example a subsea oil or gas wellhead and a subsea manifold to establish a fluid conduit between these stations. The flowline bundle is transported by a surface vessel to location where downhaul cables are then brought to the surface from the underwater stations by means of call-up buoys. A flowline mating vehicle is connected to each end of the flowline bundle, the downhaul cables are attached to powered winches contained in these vehicles, and the bundle is then hauled downward by the vehicles to the subsea stations where it is connected to the terminals of the flowlines at these stations by a remotely actuated clamping system. The flowline mating vehicles are then released from the flowline bundle and the stations to be retrieved at the surface for reuse. The invention is applicable to both "wet" and "dry" wellhead completions, and includes apparatus for accomplishing these completions entirely by remote control from the surface.

11 Claims, 17 Drawing Figures

FIG_9

FIG_10

FIG_11

FIG_12

FIG_13

FIG_17

METHOD AND APPARATUS FOR INSTALLING UNDERWATER FLOWLINES

BACKGROUND OF THE INVENTION

This invention relates to methods and apparatus for installing underwater pipelines, and particularly for connecting underwater petroleum flowlines to a subsea wellhead or other underwater facility for establishing a means to conduct produced well fluids to a reservoir or other gathering system.

Production of petroleum from offshore subsea wells has developed to the point where this activity is now in progress worldwide. After a subsea well is completed, the crude oil is conducted through a system of flowlines to a production station where it is processed and ultimately transported to an offshore loading facility or to a landbased reservoir.

Accurate placement of these flowlines so that the flowline terminal connections can be made is a difficult task when conventional pipeline laying techniques are used, especially in areas such as the North Sea where weather and water conditions are extremely hostile, and in other areas where the water depth is very great. The ends of the flowline must be laid past the subsea stations in such a manner as to form a curved or looped configuration to allow for flexibility in the flowline when the terminal connections are made. However, surface effects (wave action, wind and currents) make accurate placement of a flowline virtually impossible, and water column currents increase the liklihood of inaccuracy in this task.

Furthermore, conventional underwater pipelaying techniques require the use of specialized surface vessels which normally are very expensive, and the congestion of other flowlines, piping and ancillary equipment increases this problem. When the terminals of the flowline are pulled along the ocean floor into an alignment frame at the wellhead or other subsea station, sophisticated pulling equipment and large power requirements are needed. Still another problem is that existing techniques are not readily adaptable to both "wet" and "dry" well completion systems, that is where the wellhead connections are made in a water or air atmosphere.

SUMMARY OF THE INVENTION

The present invention involves an improved technique for installing an underwater flowline bundle, and includes a new remotely controllable flowline mating vehicle that functions to downhaul the bundle from a surface vessel to a subsea station for connection to the station's flowline terminal. The flowline mating vehicle preferably contains a winch system for reeling in a downhaul cable attached to the subsea station, thereby hauling itself and the flowline bundle to which it is connected down to the station, a buoyancy system, a clamping system for releasably connecting it to the flowline bundle, a system for aligning and releasably latching it to the subsea station, a video system including cameras and lighting equipment, a ram system with hydraulics and hardware for forcing the flowline bundle terminals into contact with the flowline terminals at the station, and means for controlling the winching, buoyancy, clamping, latching, video, and ram systems.

Power is supplied to the flowline mating vehicle by an umbilical that extends from a control van on a surface vessel, and when the vessel is properly landed at the subsea station a connection is established with a power receptacle on the station to facilitate actuation of a connector system that achieves a fluid-tight seal between the flowline terminals of the bundle and of the station.

The method of the present invention involves the use of two flowline mating vehicles, one at each end of the flowline bundle, and a system of buoyancy modules or similar means to impart the necessary degree of buoyancy to the flowline bundle as it is being transported to location by a surface vessel, and then downhauled to the subsea stations. Following connection of the flowline bundle to the flowline terminals at the stations, the flowline mating vehicles are released from the stations and the bundle and retrieved at the surface for reuse.

The method of this invention also preferably involves two surface vessels, one at each end of the flowline bundle to facilitate proper and safe control of the bundle, the flowline mating vehicles, and the other equipment involved in carrying out the installation according to the invention. Thus each vessel can serve to transport a flowline mating vehicle to location, and then function as a work station for connecting the vehicle to the respective flowline bundle end and the downhaul cable.

Also embodied in the present invention is a self-contained hauldown tool that can be used to transport one end of the hauldown cable from a reel thereof on the surface vessel down to the subsea station, secure this cable end to an anchor post at the station, and then return to the surface for retrieval and reuse. This procedure is especially advantageous when the subsea station is in water so deep that the hauldown cable and spool in the recall buoy package are unavoidably and undesireably large.

The present invention can be employed to install a flowline bundle at either a "wet" or "dry" wellhead completion system. For example, it can be used to connect a flowline bundle to a subsea station of the wet variety as described in Brown et al U.S. Pat. No. 3,592,014, issued July 13, 1971, and also to a dry subsea station as described in Bergquist et al U.S. Pat. No. 3,795,115, issued March 5, 1974.

Accordingly, one object of the present invention is to provide a new and improved method and apparatus for installing underwater flowlines.

Another object of the present invention is to eliminate the surface effects of wave action, wind and currents during installation of underwater flowlines.

Another object of the present invention is to reduce the number of surface vessels, and thus the expense involved thereby, that are normally required to install underwater flowlines.

Still another object of the present invention is to provide a subsea flowline installation method that is adaptable to either "wet" or "dry" well completion systems.

Yet another object of the present invention is the provision of a new method and apparatus for installing underwater flowlines that eliminate or greatly reduce the problems encountered in crowded subsea manifold areas.

A still further object of the present invention is to provide a new flowline installation method and apparatus that facilitate landing the ends of the flowline directly into their alignment frames of the subsea stations, thereby eliminating the problems associated with dragging these ends along the ocean floor.

Other objects and advantages of the present invention will become apparent from the following description thereof, including the accompanying drawings.

BRIEF DESCRIPTION OF THE DRAWINGS

FIGS. 1-6 diagrammatically illustrate the sequence of operations when the method of the present invention is employed to install an underwater flowline bundle between a subsea petroleum wellhead and a subsea pipeline manifold.

DESCRIPTION OF THE PREFERRED EMBODIMENT

The method of the present invention is best illustrated by FIGS. 1-6, and the following description of this method is in reference thereto.

Figure 1:
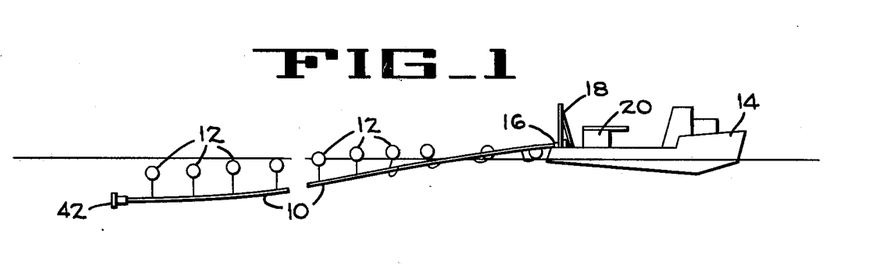
FIG. 1 illustrates the flowline bundle being towed by a surface vessel to location, the bundle provided with buoyancy modules for flotation.
Figure 2:
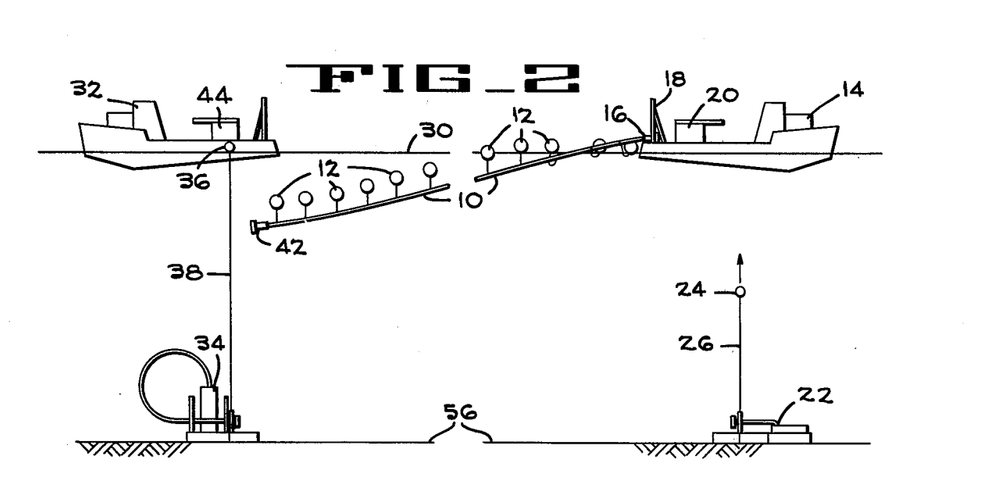
FIG. 2 illustrates the surface vessel and flowline bundle of FIG. 1 on location, a second surface vessel on its location, the call-up buoy ascending from the subsea pipeline manifold to the first surface vessel, and the call-up buoy from the subsea wellhead floating on the surface alongside the second vessel.

As shown in FIG. 1, a previously fabricated underwater flowline bundle 10, usually provided with a flotation system such as releasable buoys 12, is towed to location at the worksite by a surface vessel 14. The vessel 14 can be a typical offshore workboat, as this invention precludes the need for more elaborate and expensive vessels, such as lay barges, to carry out the method. One end 16 of the flowline bundle 10 is supported on the vessel 14, and the vessel is provided with necessary rigging, such as a boom or hoist system 18. The vessel 14 also carries a flowline mating vehicle 20 for later attachment to the flowline bundle end 16.

Once the vessel 14 is on site over a subsea station, such as a subsea production manifold 22, (FIG. 2), an acoustically controlled call-up buoy/cable spool assembly 24, which is attached to one end of a downhaul cable 26 that is secured at its other end to an anchor post 28 (FIGS. 7, 9, and 10), is signalled to the water surface 30. A second surface vessel 32, which also can be a typical offshore workboat with the required rigging, is maneuvered into location over the other subsea station, such as a subsea wellhead 34, to which the flowline bundle 10 is to be connected, and a second acoustic call-up buoy/cable spool assembly 36, which is attached like the buoy/spool assembly 24 to a downhaul cable 38, is signalled to the surface 30. As the buoy/spool assemblies 24,36 ascend, the hauldown cables 26,38 are paid out, and at the surface the buoy/spool assemblies 24,36 are recovered aboard their respective vessels 14,32.

Figure 3:
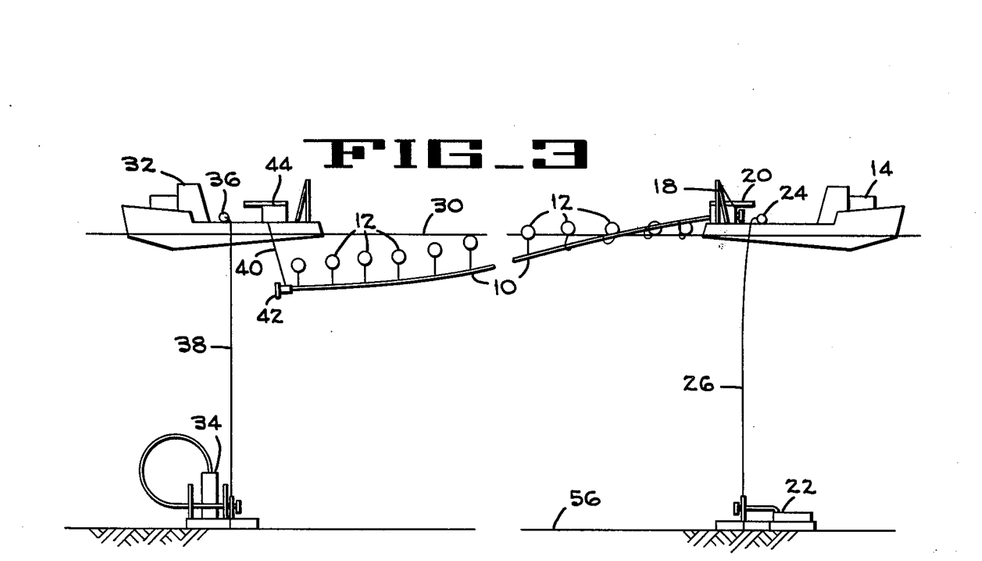
FIG. 3 illustrates recovery of the free end of the flowline bundle by a tag line from the second vessel.

As shown in FIG. 3, after the buoy/spool assemblies 24,36 are on board their vessels 14,32, a tag line 40 from vessel 32 is employed to recover the free end 42 of the flowline bundle 10 for subsequent attachment to a second flowline mating vehicle 44 carried by the vessel 32.

Figure 4:
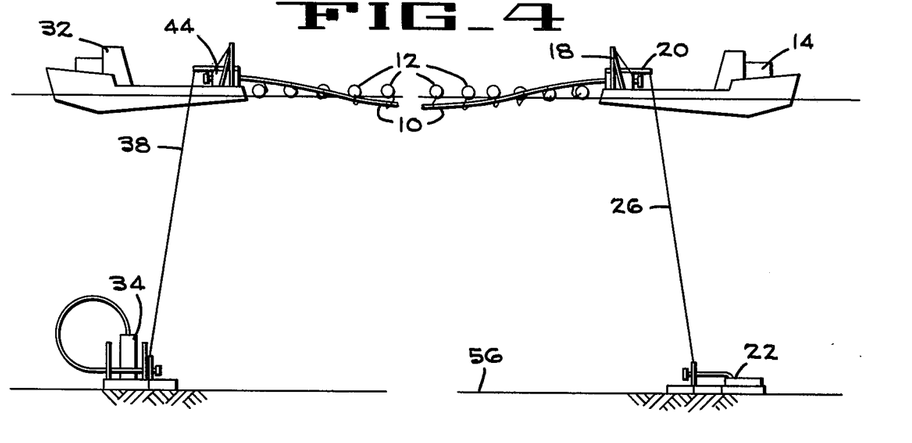
FIG. 4 illustrates the flowline bundle ends attached to the flowline mating vehicles on the two surface vessels, and the downhaul cables from the subsea wellhead and manifold attached to the vehicle winches.

As represented in FIG. 4, the flowline mating vehicles 20,44 are the attached to the flowline bundle ends 16,42, respectively, and the upper ends of the downhaul cables 26,38, from which the buoy/spool assemblies 24,36 have been removed, are fairleaded through sheave systems on the vehicle 20,44 such as the sheaves 46,48 (FIG. 8) on the vehicle 20, and connected to winch systems 49 (FIG. 8) within the vehicle's housings, such as 50 (FIG. 8) of vehicle 20. The power umbilicals 52,54 are (best seen in FIG. 5) attached to the vehicles 20,44 and the vehicle's buoyancy is adjusted, if required, by ancillary buoyancy means (not shown).

Figure 5:
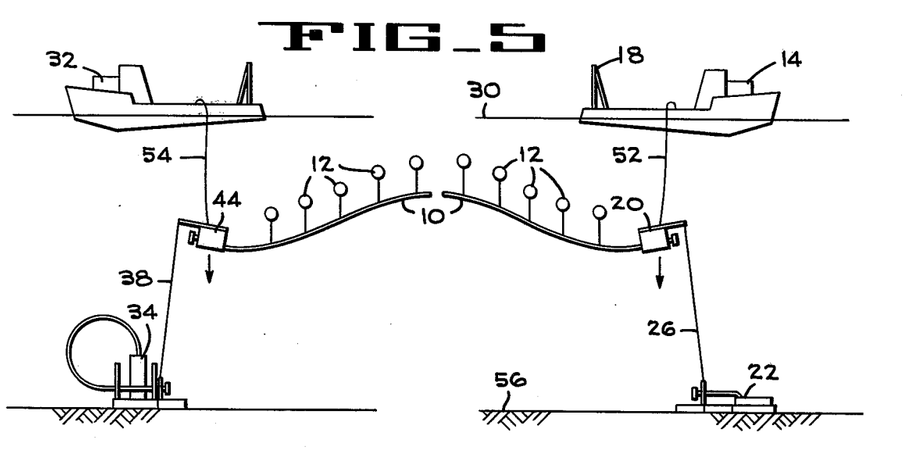
FIG. 5 illustrates the flowline bundle on its way down to the two subsea stations, with umbilicals extending between the flowline mating vehicles and the surface vessels.
Figure 6:
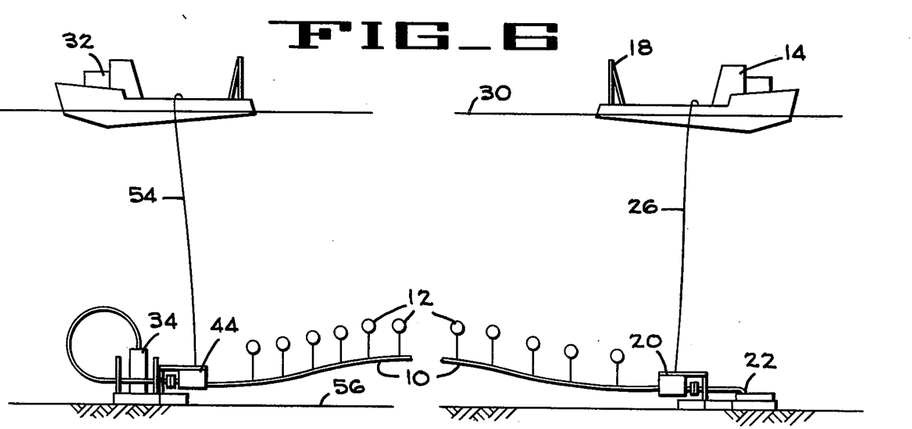
FIG. 6 illustrates the flowline bundle landed on and connected to the two subsea stations, just prior to release of the vehicles for their retrieval at the surface.

As illustrated in FIG. 5, the flowline mating vehicles 20,44 are then lowered into the water and their winches activated to reel in the downhaul cables 26,38 thereby pulling the vehicles and the flowline bundle 10 towards the ocean floor 56.

Figure 7:
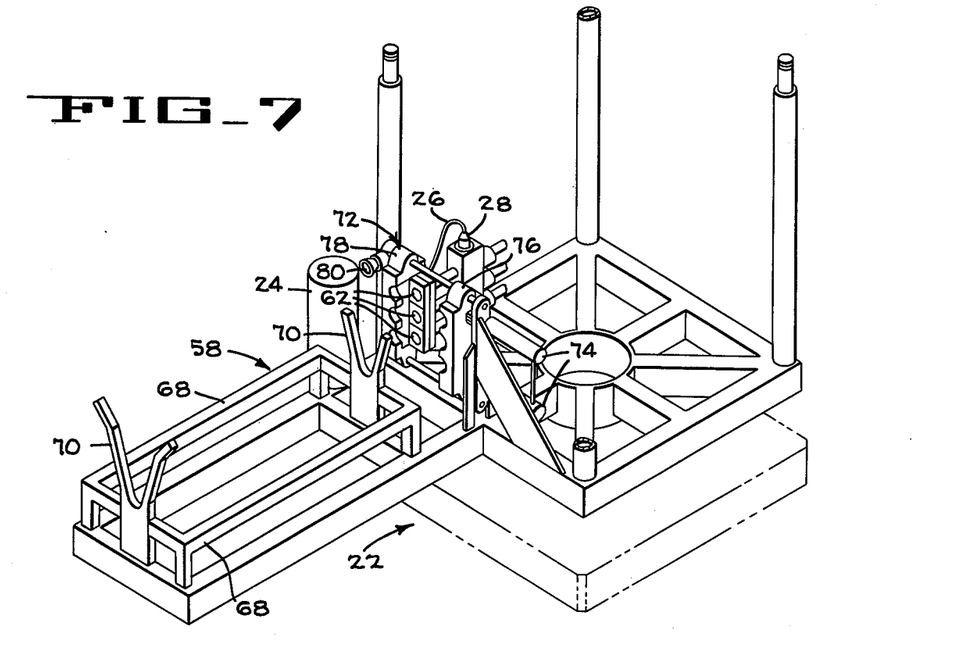
FIG. 7 is an diagrammatic isometric illustration of a typical subsea station with a landing and alignment structure for receiving a flowline bundle according to the present invention.
Figure 8:
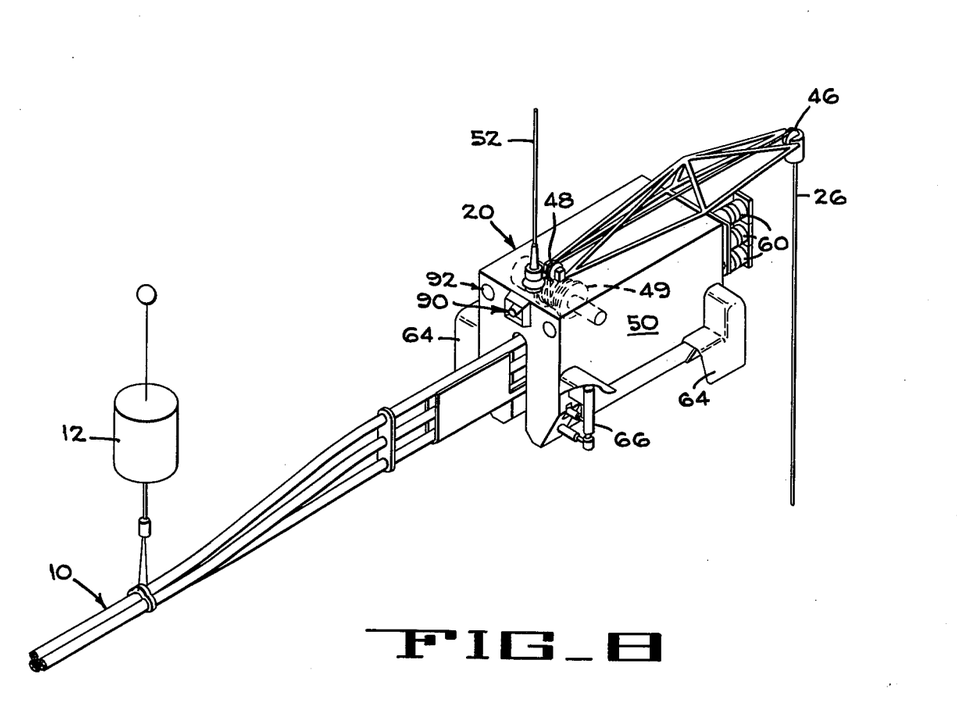
FIG. 8 is an isometric view of a flowline mating vehicle according to the present invention, showing it attached to one end of a flowline bundle.
Figure 9:
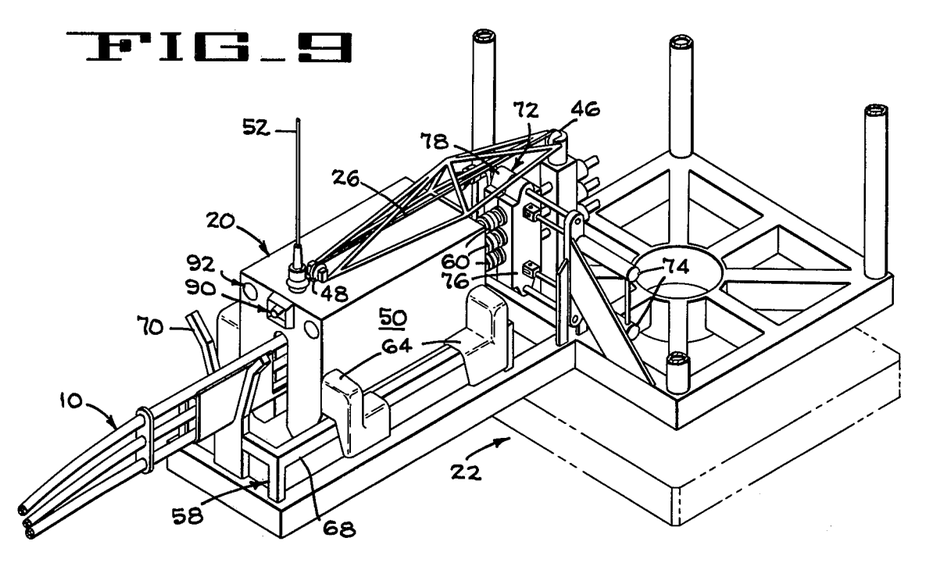
FIG. 9 is a view like FIG. 7, showing the flowline mating vehicle and bundle of FIG. 8 in position on the landing and alignment structure, and the flowline terminals connected in a fluid-tight condition.
Figure 10:
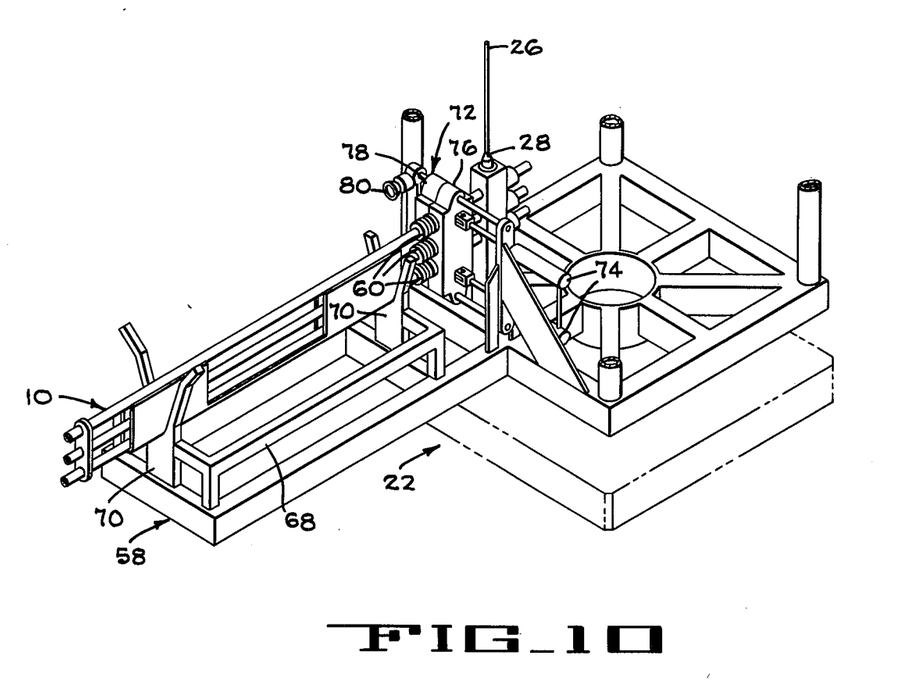
FIG. 10 is a view like FIG. 9, showing the flowline mating vehicle removed from the flowline bundle and the subsea station.

When the flowline mating vehicles 20,44 arrive at the subsea stations 22,34 (FIG. 6) they come to rest on landing/alignment structures at these stations, such as that illustrated at 58 in FIGS. 7, 9 and 10. Proper alignment of the terminals 60 (FIG. 8) of the flowline bundle 10 with the terminals 62 (FIG. 7) at the subsea stations is assured through the cooperation of an alignment and latching system on the vehicles, such as the guides 64 (FIGS. 8 and 9) and latching mechanism 66 (FIG. 8), with the side rails 68 and V-shaped upright guide elements 70 of the structure 58. It should be understood that this alignment and latching system is representative only, and that other types of systems for achieving this same purpose can be employed within the scope of the present invention.

Establishing the final connection between the flowline bundle terminals 60 and the flowline terminals 62 at the subsea stations 22,34 is accomplished by actuating a ram system (not shown) contained in the flowline mating vehicle 20,44 to force the terminals 60 against the terminals 62, and then actuation of a connector system 72, (FIGS. 7, 9 and 10) including rams 74, mounted on the subsea station. Upon actuation, the rams 74 force the movable connector element 76 towards the stationary element 78, resulting in a secure, fluid-tight joint between these terminals as illustrated in FIGS. 9 and 10. Power for operation of the rams 74 is supplied from the surface vessel through the umbilical and flowline mating vehicle to a power receptacle 80 on the subsea station, this receptacle 80 mating with a stab-type element (not shown) on the vehicle. It should be understood that the method and apparatus herein described can be adapted to other hard flange-type connector systems without departing from the scope of the invention.

As illustrated in FIGS. 8 and 9, the flowline mating vehicle 20 can be provided with a remotely controllable pan and tilt video system 90 and a lighting system 92 for monitoring the operation of the apparatus during the flowline installation procedure.

Figure 11:
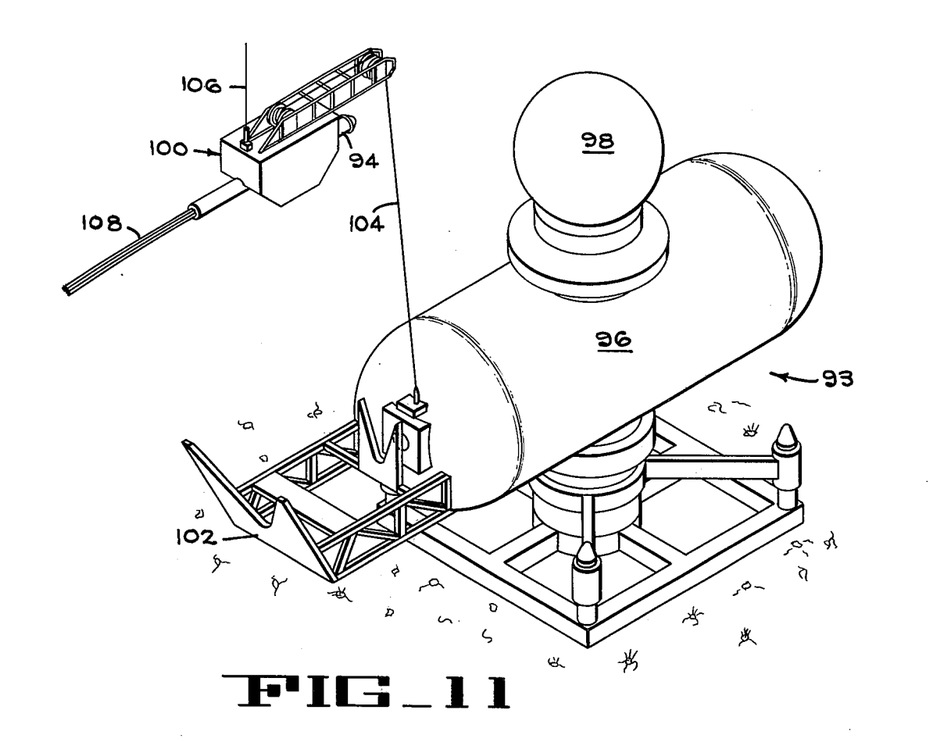
FIG. 11 is an isometric diagrammatic illustration of a subsea wellhead equipped with a "dry" completion system, and a modified form of flowline mating vehicle attached to one end of a flowline bundle and descending to the landing and alignment structure at the wellhead.
Figure 12:
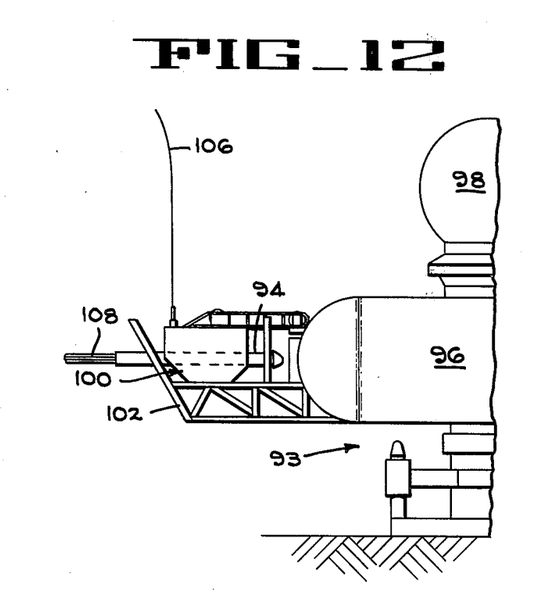
FIG. 12 is a fragmentary view in elevation of a portion of the subsea wellhead of FIG. 11, showing the flowline mating vehicle landed at the wellhead.
Figure 13:
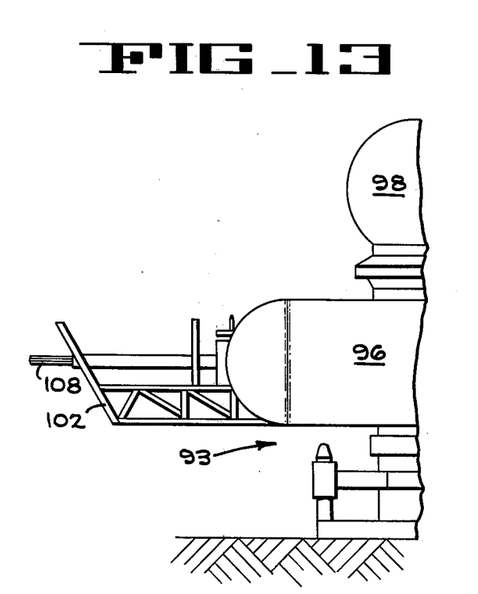
FIG. 13 is a view like FIG. 12, showing the completed connection of the flowing bundle to the wellhead, and the flowline mating vehicle removed.

When the method of this invention is employed to install a flowline bundle at a "dry" type of subsea station, such as that described in Bergquist et al U.S. Pat. No. 3,795,115 and diagrammatically illustrated at 93 in FIGS. 11, 12, 13 of this application, the flowline bundle terminal 94 is adapted to be connected to the station flowline terminal inside an air-filled chamber 96 at atmospheric pressure, so that workmen can descend in an air-filled personnel transfer module 98, also at atmospheric pressure, to the chamber 96 and make up the connection therein. The flowline mating vehicle 100 is adapted to perform its above described functions in essentially the same manner when this type of "dry" completion is effected, and the changes in shape or design of the vehicle and the landing/alignment structure 102 are not critical with respect to the invention. Thus, the downhaul cable 104, the umbilical 106, and the flowline bundle 108 can remain unchanged.

When the method and apparatus of the present invention are employed in very deep water, the amount of hauldown cable 26 contained on the spool of the call-up buoy/spool assembly 24 is so extensive that the spool and cable package can be undesireably large. To overcome this problem, the present invention includes a novel self-contained hauldown tool 110 (FIGS. 14–17) that functions to take the lower end of the hauldown cable 112 from a surface vessel 114 down to the subsea station 116 and secure it to an anchor post 118. The tool 110 comprises a spool assembly 120 containing a battery-powered winch 121 for reeling in a relatively small diameter cable 122 such as is found in commercially available recall buoy packages, and a hauldown anchor assembly 124 to which is attached the bottom end of the hauldown cable 112. The spool assembly 120 is releasably connected to the anchor assembly 124 by a remotely controllable connector system 126, and the anchor assembly includes a latch system for securing the assembly 124 to the post 118.

Figure 14:
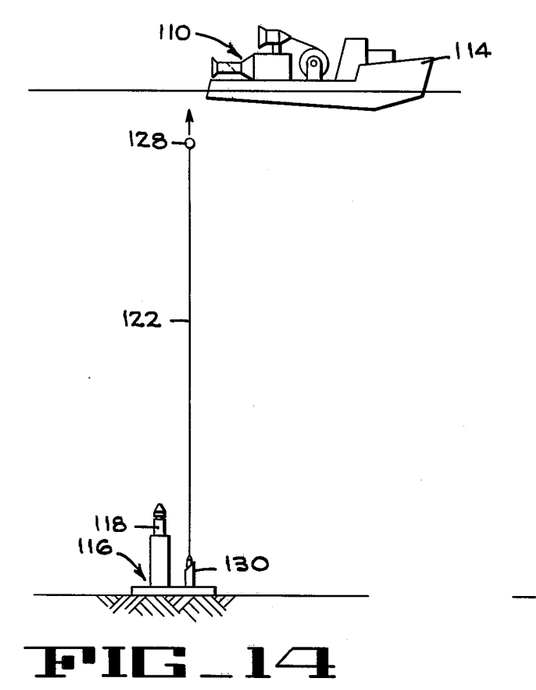
FIG. 14 is a diagrammatic illustration of a call-up buoy ascending from a modified subsea station to a surface vessel, and a guide cable of relatively small diameter extending between the buoy and a guide post at the station.
Figure 15:
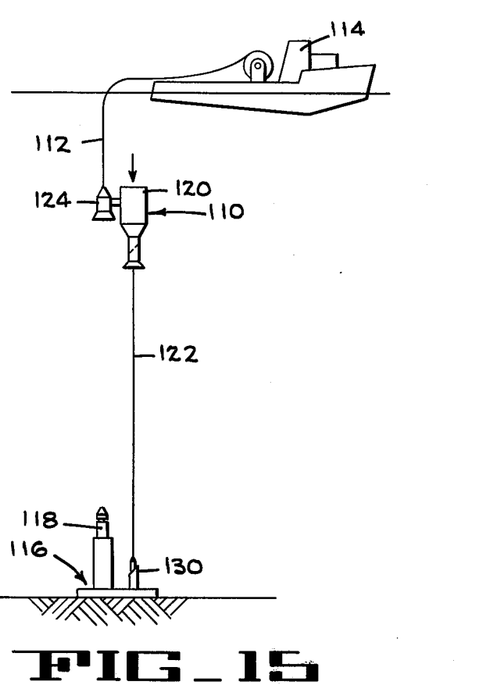
FIG. 15 is a view like FIG. 14, showing a self-contained hauldown tool descending from the surface vessel to the subsea station on the guide cable, and a hauldown cable extending from the tool to the surface vessel.

When this hauldown tool 110 is employed, it is transported by a surface vessel 114 to location, and a call-up buoy 128 is signalled to the surface to bring up one end of the small cable 122 from the subsea station 116, the other end of this cable being attached to a landing post 130. The call-up buoy 128 is removed from the cable 122, the cable is attached to the winch 121 in the spool assembly 120, and the hauldown tool placed in the water. The winch 121 then is actuated; whereupon it reels in the small cable 122 and pulls the tool 110 and the hauldown cable 112 to the subsea station 116.

Figure 16:
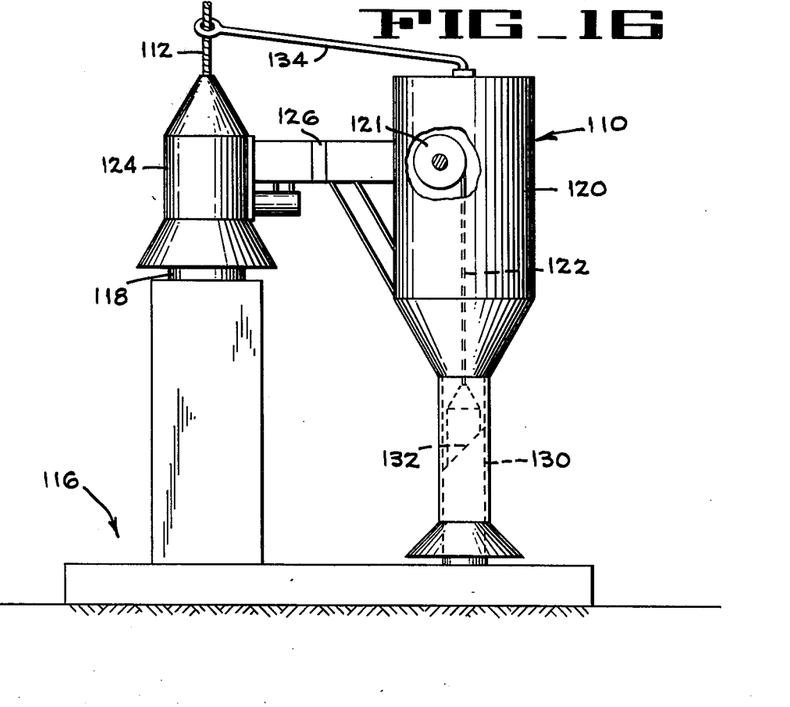
FIG. 16 is an enlarged diagrammatic elevation of the self-contained hauldown tool of FIG. 15 landed on the modified subsea station of FIGS. 14 and 15, and the hauldown cable secured to its anchor post at the station.
Figure 17:
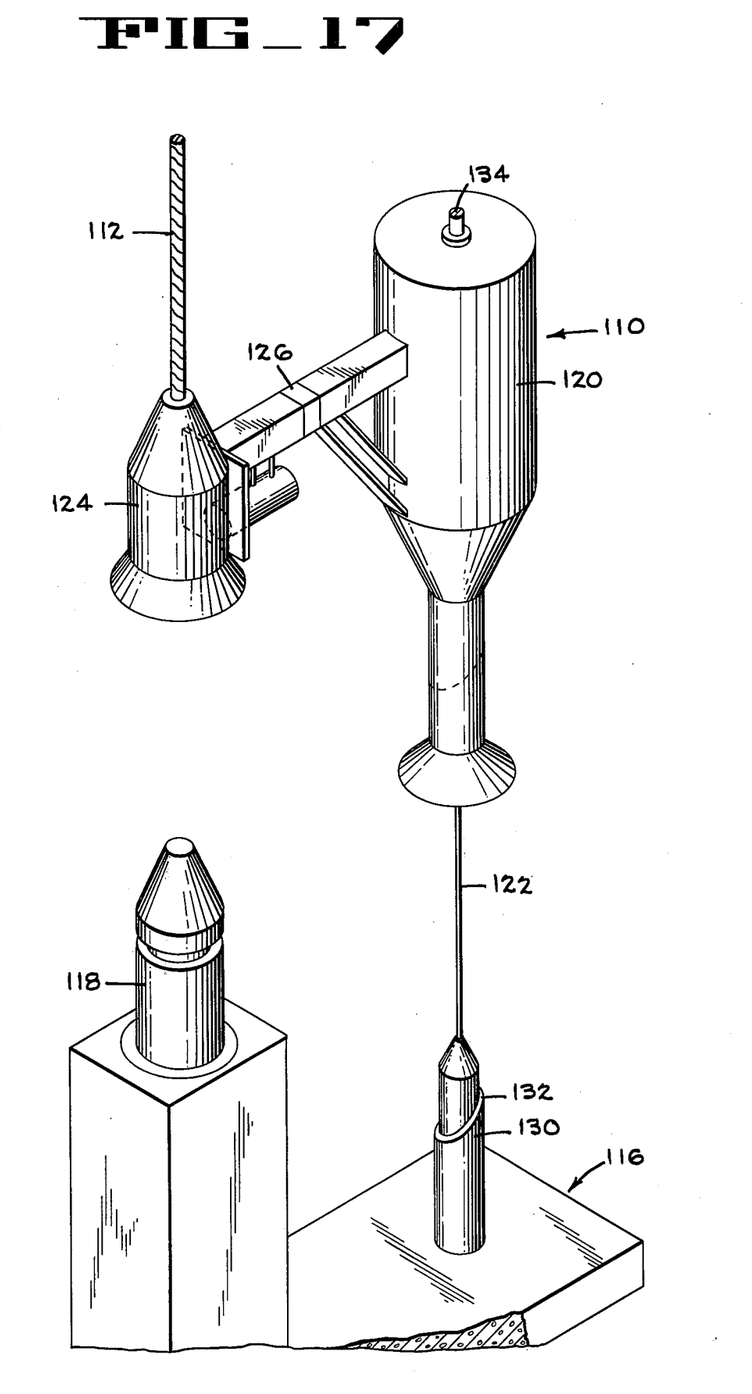
FIG. 17 is an enlarged isometric fragmentary view of the self-contained hauldown tool and the modified subsea station of FIG. 16, showing their relationship just prior to landing the tool on its guidepost.

When the tool 110 reaches the subsea station 116, the spool assembly lands on the post 130, and is positioned thereon by an orientation cam 132 so that the anchor assembly 124 lands on the anchor post 118. Actuation of the latch system in the tool 110 then secures the anchor assembly 124 to the post 118, thereby connecting the hauldown cable 112 to the subsea station for subsequent use by a flowline mating vehicle as previously described. The connector system 126 is then actuated, releasing the spool assembly from the anchor assembly 124 whereby the spool assembly floats to the surface as controlled by a guide 134 and the cable 112, and is thus retrievable for reuse.

Although the best mode contemplated for carrying out the present invention has been herein shown and described it will be apparent that modification and variation may be made without departing from what is regarded to be the subject matter of the invention, as set forth in the appended claims.

I claim:

1. A method for installing a flowline underwater at a subsea station, comprising the steps of
   a. establishing a downhaul cable between the subsea station and a location above said station,
   b. attaching the downhaul cable to a flowline mating vehicle connected to an end of the flowline,
   c. hauling down the flowline and the flowline mating vehicle to the subsea station by reeling the downhaul cable into the flowline mating vehicle, and
   d. connecting the flowline to the subsea station.

2. A method according to claim 1 wherein the downhaul cable is reeled onto a winch means carried by the flowline mating vehicle.

3. A method according to claim 1 wherein the flowline comprises a flowline bundle with two ends, wherein each of said ends is attached to a flowline mating vehicle having winch means for reeling in a downhaul cable, and wherein said flowline mating vehicles are downhauled by said winch means simultaneously.

4. A method according to claim 1 wherein there are two subsea stations, wherein the flowline has two ends each of which is connected to a flowline mating vehicle equipped with winch means, and wherein each end is hauled down to a subsea station by operation of said winch means to establish an underwater conduit means between said subsea stations.

5. An apparatus for installing a flowline underwater at a subsea station comprising
   a. a body means,
   b. means for attaching said body means to said flowline, c. means for attaching said body means to a downhaul cable,
d. winch means connected to said body means for reeling in said downhaul cable to said body means, and
e. means for controlling the operation of said apparatus from a remote location.

6. An apparatus according to claim 5 including means for aligning said body means with said subsea station.

7. An apparatus according to claim 5 including means for establishing a fluid-tight connection between said flowline and said subsea station.

8. An apparatus according to claim 7 wherein said means comprises a fluid-actuated ram system.

9. An apparatus according to claim 8 wherein said ram system includes means to establish contact between said flowline and said subsea station, and means to secure said flowline to terminal means at said subsea station.

10. A marine hauldown tool for transporting an end of a downhaul cable from a surface location to an underwater location comprising
a. body means,
b. means for attaching said body means to a guide cable,
c. winch means incorporated with said body means for reeling in said guide cable to pull said hauldown tool downward toward a subsea location at which said guide cable is secured, and
d. means for remotely controlling the operation of said hauldown tool.

11. A marine hauldown tool according to claim 10, including means to secure said downhaul cable to said subsea location.

* * * * *

UNITED STATES PATENT OFFICE
CERTIFICATE OF CORRECTION

Patent No. 4,075,862  Dated February 28, 1978

Inventor(s) THOMAS J. AMES

It is certified that error appears in the above-identified patent and that said Letters Patent are hereby corrected as shown below:

Col. 1, line 67, change "vessel" (second occurrence) to --vehicle--.
Col. 3, line 57, change "flowing" to --flowline--.
Col. 4, line 50, change "the" (first occurrence) to --then--.

Signed and Sealed this

Thirteenth Day of November 1979

[SEAL]

Attest:

RUTH C. MASON
Attesting Officer

LUTRELLE F. PARKER
Acting Commissioner of Patents and Trademarks